us008910274B2

(12) United States Patent
Sanders

(10) Patent No.: US 8,910,274 B2
(45) Date of Patent: Dec. 9, 2014

(54) MULTI-FACTOR AUTHENTICATION USING DIGITAL IMAGES OF BARCODES

(75) Inventor: Aaron Dale Sanders, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 112 days.

(21) Appl. No.: 13/192,684

(22) Filed: Jul. 28, 2011

(65) Prior Publication Data

US 2013/0031623 A1 Jan. 31, 2013

(51) Int. Cl.
*G06F 21/00* (2013.01)
*G06F 21/34* (2013.01)
*G06F 21/36* (2013.01)

(52) U.S. Cl.
CPC ............... *G06F 21/00* (2013.01); *G06F 21/34* (2013.01); *G06F 21/36* (2013.01)
USPC .................................. 726/19; 726/28; 726/30

(58) Field of Classification Search
CPC .......... G06F 21/00; G06F 21/34; G06F 21/36
USPC ............................................... 726/19, 28, 30
See application file for complete search history.

(56) References Cited

U.S. PATENT DOCUMENTS

| | | | |
|---|---|---|---|
| 5,559,961 A | 9/1996 | Blonder | |
| 7,647,036 B2 | 1/2010 | Omae et al. | |
| 8,251,290 B1 * | 8/2012 | Bushman et al. | 235/462.01 |
| 2002/0040346 A1 * | 4/2002 | Kwan | 705/51 |
| 2004/0230843 A1 | 11/2004 | Jansen | |
| 2007/0019215 A1 | 1/2007 | Yu | |
| 2007/0277224 A1 | 11/2007 | Osborn et al. | |
| 2008/0022290 A1 * | 1/2008 | Ochiai et al. | 719/315 |
| 2008/0244700 A1 | 10/2008 | Osborn et al. | |
| 2008/0304891 A1 * | 12/2008 | Saijo et al. | 400/76 |
| 2009/0172780 A1 * | 7/2009 | Sukeda et al. | 726/3 |
| 2010/0043062 A1 | 2/2010 | Alexander et al. | |
| 2010/0138914 A1 * | 6/2010 | Davis et al. | 726/19 |
| 2011/0210171 A1 * | 9/2011 | Brown et al. | 235/382 |

OTHER PUBLICATIONS http://connectid.blogspot.com/2005/11/qr-codes-for-two-factor-authentication.html (accessed Jan., 4, 2012).
Liao and Lee, "A Novel User Authentication Scheme Based on QR-Code", Journal of Networks, vol. 5, No. 8, Aug. 2010, pp. 937-941.
Dodson et al., "Snap2Pass: Consumer Friendly Challenge-Response Authentication with a Phone", 12 pages, 2010.

\* cited by examiner

*Primary Examiner* — Jeffrey D Popham
(74) *Attorney, Agent, or Firm* — MH2 Technology Law Group LLP

(57) ABSTRACT

Methods, systems, and computer-readable media for implementing a multi-factor authentication scheme utilizing barcode images in computing devices, such as standard mobile devices and smartphones having no native hardware support for reading barcodes other than standard digital camera componentry for capturing digital images of real-world phenomena. A mobile device may be configured by software to require a user, as a first authentication factor, to present a barcode, such as a Quick Response (QR) Code for image scanning using digital camera componentry built into the mobile device. The device analyzes the digital image of the barcode to decode the barcode into its encoded character data. If the device recognizes the character data as valid, then, as a second authentication factor, the device prompts the user to enter a valid password associated with the barcode. If the user-entered barcode is also valid, then the device may grant the user access.

7 Claims, 7 Drawing Sheets

MULTI-FACTOR AUTHENTICATION USING DIGITAL IMAGES OF BARCODES

TECHNICAL FIELD

The present disclosure relates generally to methods, systems, and computer-readable media for implementing a multi-factor authentication scheme utilizing barcode images in computing devices, such as standard smartphones having no native hardware support for reading barcodes other than standard digital camera componentry for capturing digital images of real-world phenomena.

BACKGROUND

As the use of handheld electronic devices, such as mobile telephones and smartphones, to store and operate on personal data becomes increasingly more prevalent, the need for securing such devices with robust authentication mechanisms to prevent unauthorized entry has also increased. Traditionally, the primary means for securing handheld devices has been to require a user to enter a password in order to gain entry to programs or data stored on the device. When used as the sole means for granting or denying access to a device, a password-only approach may be considered a "single-factor" authentication scheme.

Single-factor authentication, however, may offer only modest protection against unauthorized access, since it may be necessary to obtain access to only a single authentication credential or object in order to gain access to a system. For example, if a smartphone is secured only by a password, then an unauthorized user need only obtain the password in order to gain entry to the smartphone. To address this weakness in single-factor authentication schemes, multi-factor authentication schemes have been devised whereby a user must demonstrate a right to entry using two or more separate mechanisms.

One example of a multi-factor authentication scheme is the use of a physical security token in conjunction with a password. For example, in order to gain access to a system, in addition to supplying a valid password, a user may also be required to present a security badge having a magnetic strip or a radio frequency identification (RFID) tag for scanning. Such a token-based multi-factor authentication scheme provides an additional layer of security, since an unauthorized user would not be able to gain access to the system simply by obtaining knowledge of a valid password (e.g., by glancing over an authorized user's shoulder as he or she typed the password), but would also have to obtain possession of the token associated with the password in order to gain access.

Although token-based multi-factor authentication schemes provide an additional layer of security over single-factor authentication schemes, such as purely password-driven systems, they suffer from a number of drawbacks. For example, a security token may be stolen by an unauthorized user or may be misplaced or forgotten by an authorized user, thus preventing the authorized user from gaining access to the system. Moreover, because most computers and handheld devices lack native hardware support to detect the presence of a security token, such as a magnetic strip card reader or an RFID token scanner, it is usually necessary to install separate hardware peripheral devices in order to detect presentation of a valid physical security token.

One technique that has been devised to address several flaws in token-based multi-factor authentication schemes is to use biometric information in conjunction with a second authentication factor, such as a password. In a biometric multi-factor authentication scheme, in addition to providing a valid password, a person may also be required to demonstrate that he or she is the authorized holder of the password by providing a fingerprint, retinal scan, or other biometric information sufficient to determine biological identity. Biometric multi-factor authentication schemes have an advantage over token-based multi-factor authentication schemes in that, unlike a physical security token, biometric information may not be stolen or lost by an authorized user.

However, like token-based multi-factor authentication schemes, biometric multi-factor authentication schemes also suffer from the drawback that it is often necessary to purchase and install separate peripheral hardware devices, such as fingerprint readers or retina scanners, in order to authenticate using these techniques. Not only may such peripheral devices be expensive, but their necessity prevents users from implementing biometric scanning security mechanisms using only software upgrades to existing hardware configurations.

The situation may be slightly improved using some forms of biometric scanning, such as speech recognition and facial recognition, that, in some cases, may be able to use existing hardware configurations and rely only on software upgrades to determine biological identity. However, these forms of biometric scanning, even when implemented purely by software, also suffer from a number of drawbacks. For example, the size and complexity of software needed to perform facial or speech recognition is often immense, placing large burdens on memory and processing power that may not be appropriate for or supported by simpler or smaller computing devices such as mobile telephones and smartphones.

Robust and accurate speech or facial recognition software packages may also be prohibitively expensive, making it commercially infeasible to incorporate such software into consumer devices that are intended for mass distribution at significantly cheaper prices. Moreover, because of the innumerable complexities involved in analyzing audio data representing a human voice or image data recognizing a human face, even high-end speech and facial recognition programs are often inaccurate, leading to security-vulnerable false positives or user-frustrating false negatives. For example, such analysis may be unduly sensitive to minor variations in lighting, background noise, varying vocal intonations, etc.

Therefore, there is a need for methods, systems, and computer-readable media for implementing multi-factor authentication in handheld devices, such as mobile telephones and other computers, that are able to utilize existing hardware to detect the presence of a valid physical security token using a simple software upgrade that is significantly more accurate than biometric scanning techniques and imposes a significantly lower processing and memory burden. Such a security token should also be capable of easy generation and replication using general purpose hardware and software already commercially available to users.

SUMMARY OF THE INVENTION

The present disclosure relates generally to methods, systems, and computer-readable media for implementing a multi-factor authentication scheme utilizing barcode images in computing devices, such as standard smartphones having no native hardware support for reading barcodes other than standard digital camera componentry for capturing digital images of real-world phenomena.

In some embodiments, a mobile device may be configured by software to require a user, as a first authentication factor, to present a barcode, such as a Quick Response (QR) Code for image scanning using digital camera componentry built into the mobile device. The device analyzes the digital image of the barcode to decode the barcode into its encoded character data. If the device recognizes the character data as valid, then, as a second authentication factor, the device prompts the user to enter a valid password associated with the barcode. If the user-entered barcode is also valid, then the device may grant the user access.

During initialization of the multi-factor authentication mechanism, the user may scan an existing barcode as a valid authentication barcode, and may further specify a password associated with the barcode. Alternatively, the user may specify a text string, such as a user-chosen passphrase, which the device may then store as a valid character string that must be presented in the form of a barcode in order to satisfy the first authentication factor. In either embodiment, the invention presents an advantage over traditional physical token-based security schemes in that the user may easily design, specify, generate, reproduce, or modify his or her preferred physical security token.

The invention is also preferable over traditional physical token-based security schemes and certain biometric security schemes in that the physical token may be introduced as an additionally required authentication factor without the need for any additional hardware over that typically provided with commercially available mobile devices, such as smartphones. The invention is further preferable over biometric authentication schemes that do not require special purpose hardware, such as some voice and speech recognition programs, in that, unlike voice and speech recognition software, the software required to detect and decode many standard barcodes, such as QR Codes, imposes considerably lower processor and memory burdens. The invention is further preferable over biometric authentication schemes in general in that decoding many standard barcodes is a considerably more straightforward operation than pairing detecting patterns in biometric data, is typically far less prone to producing false positives or false negatives, and is far less sensitive to environmental factors, such as lighting or minor graphical variations or imperfections. In fact, several standard barcode formats, such as QR Codes, have built-in error-correction mechanisms, thus further enhancing their reliability despite potential graphical imperfections.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together, with the description, serve to explain the principles of the invention. In the drawings.

DETAILED DESCRIPTION

Figure 1:
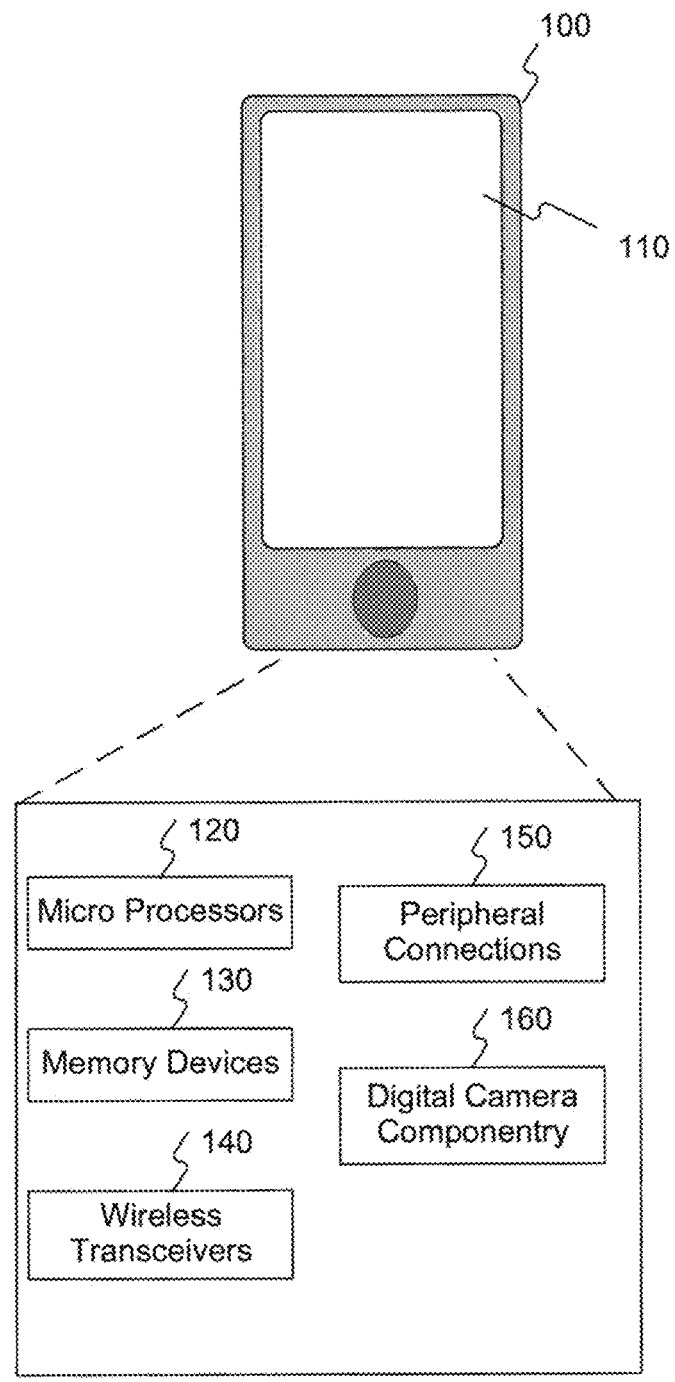
FIG. 1 is a diagram depicting an exemplary mobile device that may be used to implement a multi-factor authentication scheme using scanned barcodes, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

FIG. 1 is a diagram depicting an exemplary mobile device that may be used to implement a multi-factor authentication scheme using scanned barcodes, consistent with certain disclosed embodiments. Although depicted in FIG. 1 as a handheld mobile device, such as a smartphone or personal digital assistant (PDA), device 100 is not limited to handheld or mobile devices, but may comprise any computing device for which it may be desired to secure access using the multi-factor authentication techniques described herein. Using the example of a handheld mobile device, device 100 may comprise a display screen 110, such as a liquid crystal display (LCD), plasma, cathode-ray, pixel-based display, or other type of screen capable of rendering text or graphical data, such as a graphical user interface (GUI). Device 100 may additionally include, for example, one or more microprocessors 120 of varying core configurations and clock frequencies; one or more memory devices or computer-readable media 130 of varying physical dimensions and storage capacities, such as flash drives, hard drives, random access memory, etc., for storing data, such as images, files, and program instructions for execution by one or more microprocessors 120; one or more wireless transceivers 140 for communicating over wireless protocols, such as wireless Ethernet, code divisional multiple access (CDMA), time division multiple access (TDMA), etc.; one or more peripheral connections 150, such as universal serial bus (USB) connections or video interfaces; and one or more digital camera components 160 capable of capturing light information and converting the light information into digital images. Those skilled in the art will appreciate that the above-described componentry is exemplary only, as device 100 may comprise any type of hardware componentry, including any necessary accompanying firmware or software, for performing the disclosed embodiments.

Figure 2:
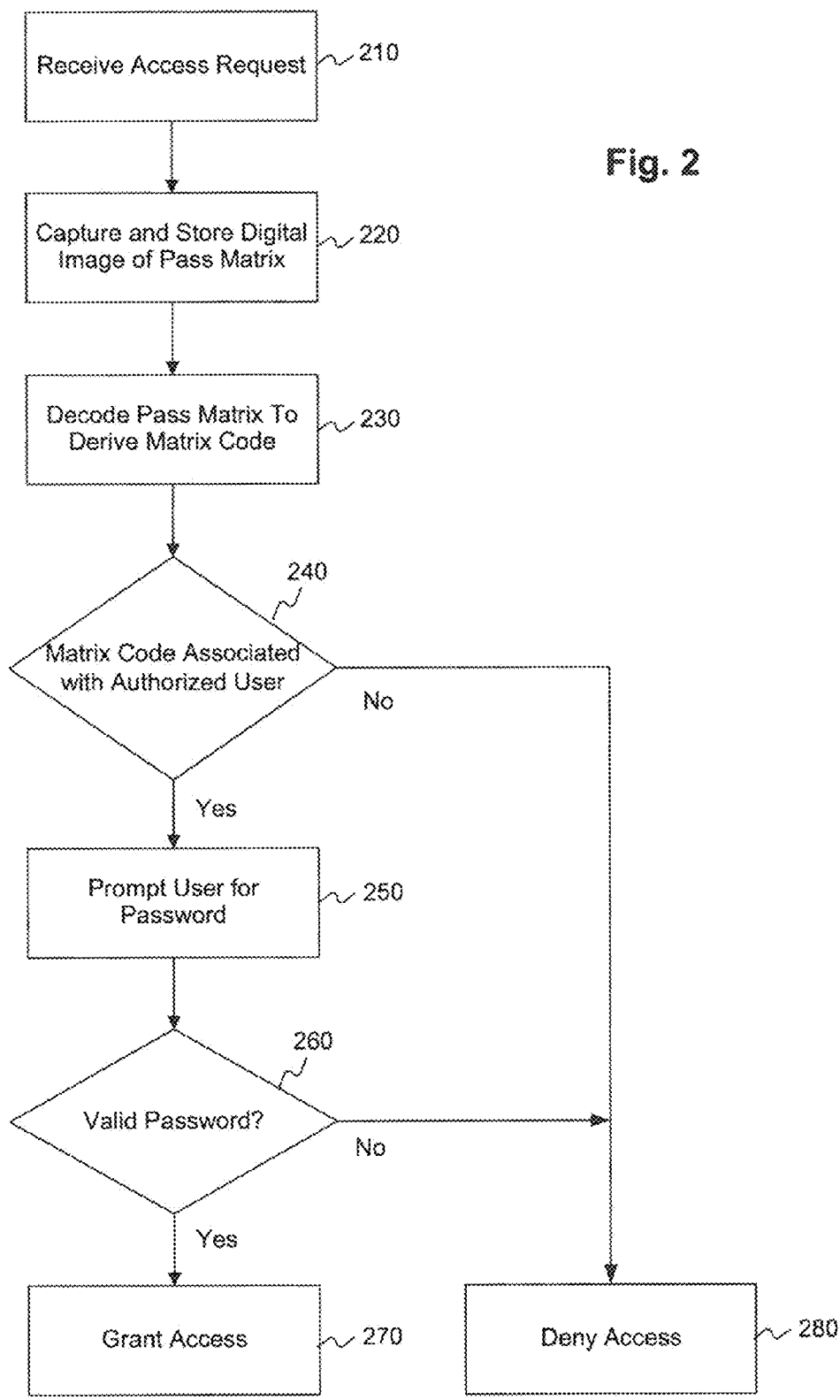
FIG. 2 is a flow diagram illustrating an exemplary method of implementing a multi-factor authentication scheme using scanned barcodes, consistent with certain disclosed embodiments.
Figure 3:
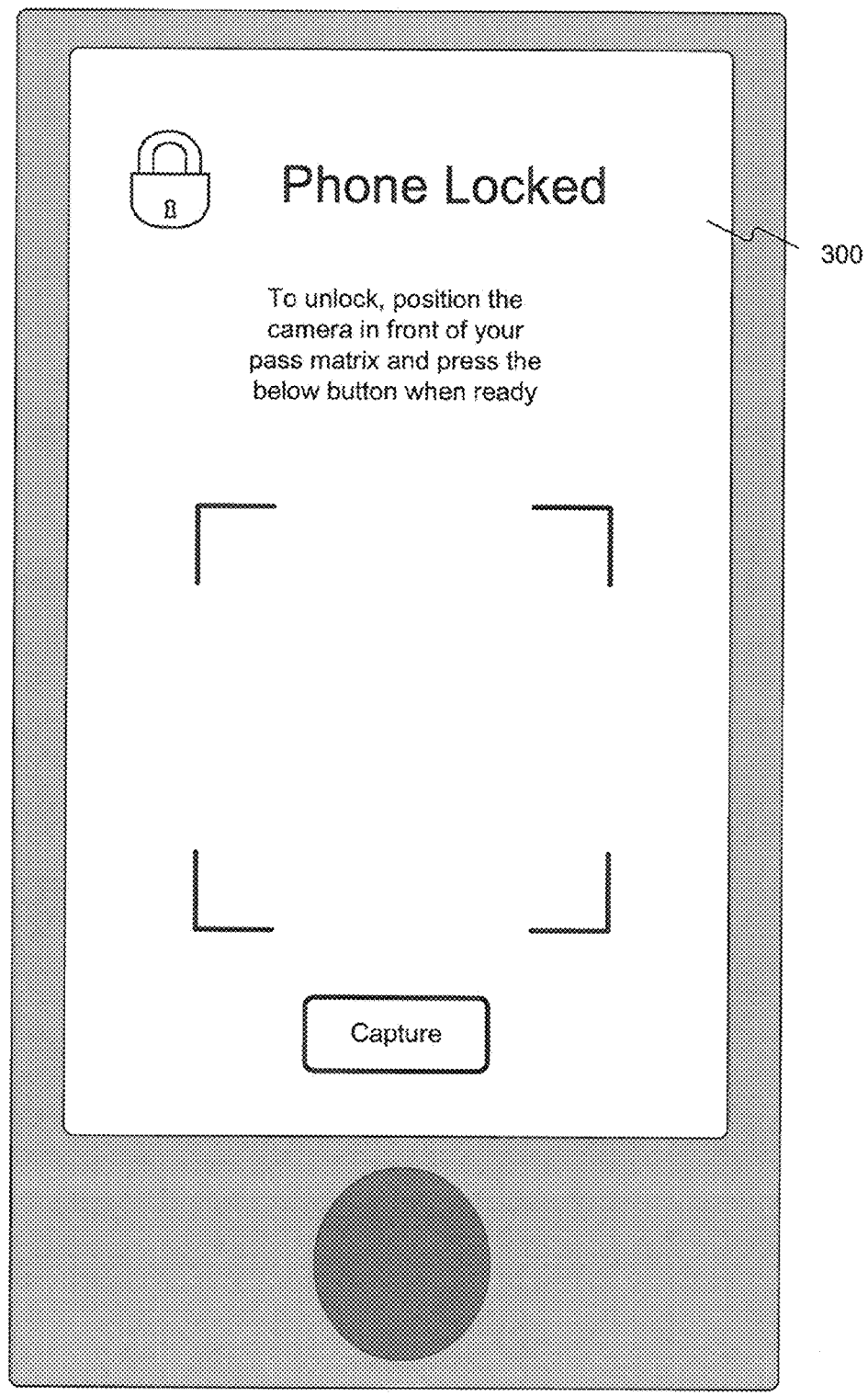
FIG. 3 is a diagram depicting an exemplary startup screen in a mobile device implementing a multi-factor authentication scheme using scanned barcodes, consistent with certain disclosed embodiments.

FIG. 2 is a flow diagram illustrating an exemplary method of implementing a multi-factor authentication scheme using scanned barcodes, as depicted in FIGS. 3-7, consistent with certain disclosed embodiments. In step 210, device 100 receives a request to access device 100. For example, if device 100 has been powered down or locked out, a user's act of booting up device 100 or causing device screen 110 to display a GUI may be interpreted by device 100 as a request to access device 100. Accessing device 100 may comprise enabling a user to place phone calls, access the Internet, or launch or operate one or more applications using device 100, or accessing user or other data stored on device 100.

Figure 4:
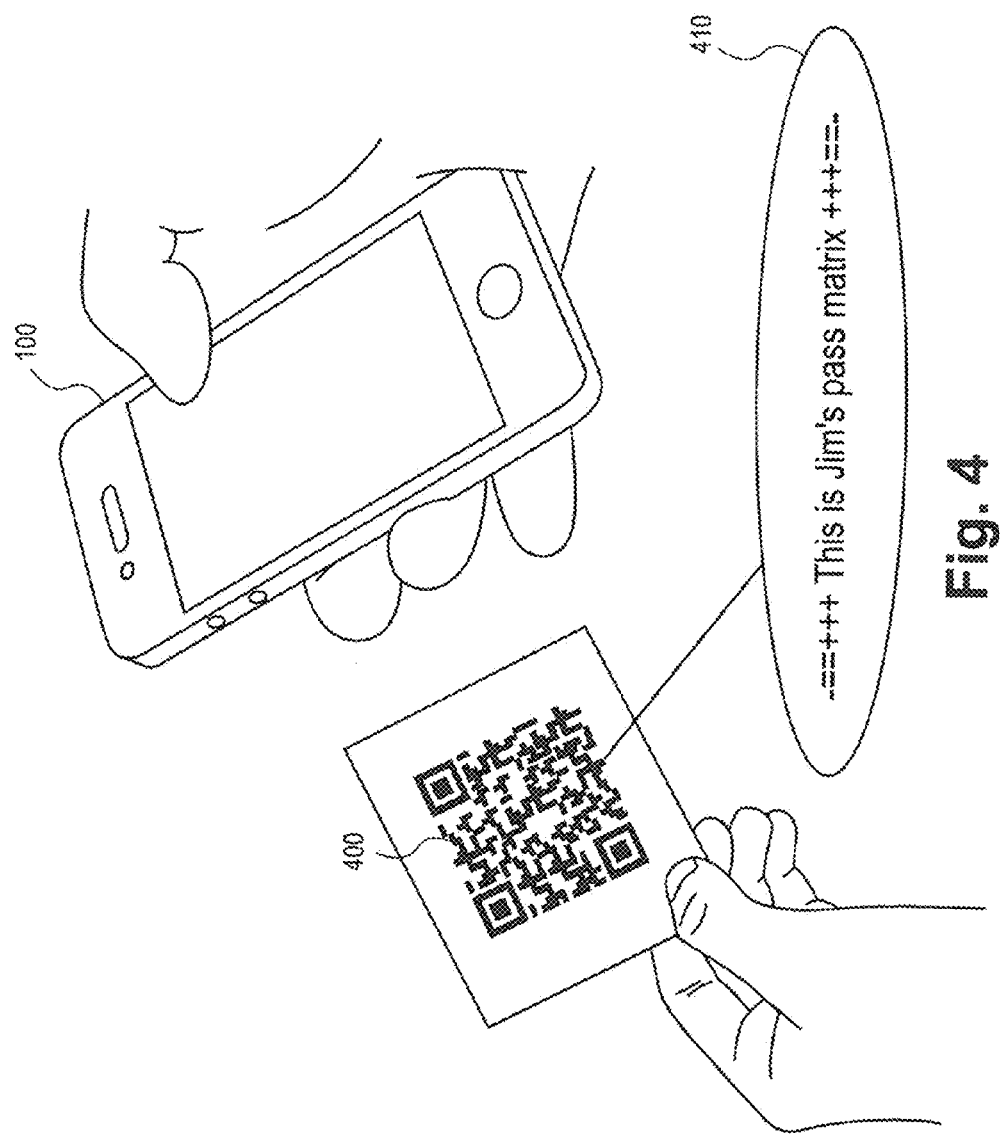
FIG. 4 is a diagram depicting an exemplary approach to scanning a barcode using a mobile device implementing a multi-factor authentication scheme, consistent with certain disclosed embodiments.

In response to the access request, device 100 may display a "Lock Screen" 300, which informs the user that device 100 has been locked. Lock Screen 300 may also inform the user that it is necessary to scan a valid graphical image, such as a barcode or matrix barcode ("pass matrix" in FIGS. 3-7), using digital camera componentry 160, in order to gain access. As depicted in FIG. 4, a user may position a pass matrix 400 (e.g., printed on a piece of paper or cardstock) within the view of digital camera componentry 160 in order to capture a digital image of the pass matrix 400.

Pass matrix 400 may comprise any type of graphical information whatsoever that could be captured in digital image form by device 100 and compared to a graphical image, binary data, or textual data. In some embodiments, it may be preferable to embody pass matrix 400 in a barcode or a matrix barcode, such as a QR code. It may be preferable to employ a barcode as a security image, since a barcode may be decoded into simpler character data, which may be represented in binary form, thus allowing for easy validation of a particular security image.

Figure 5:
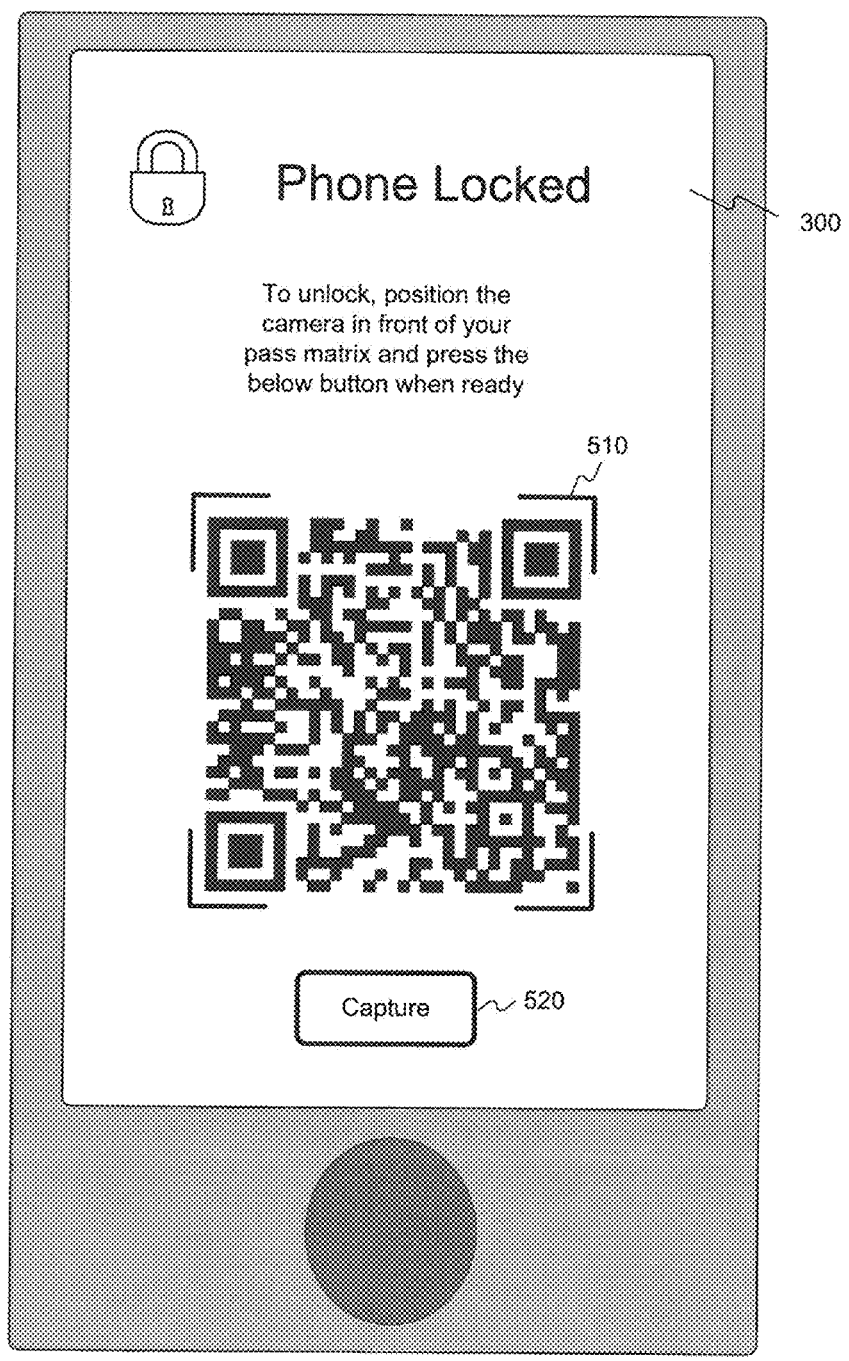
FIG. 5 is a diagram depicting an exemplary graphical user interface for scanning a barcode using a mobile device implementing a multi-factor authentication scheme, consistent with certain disclosed embodiments.
Figure 6:
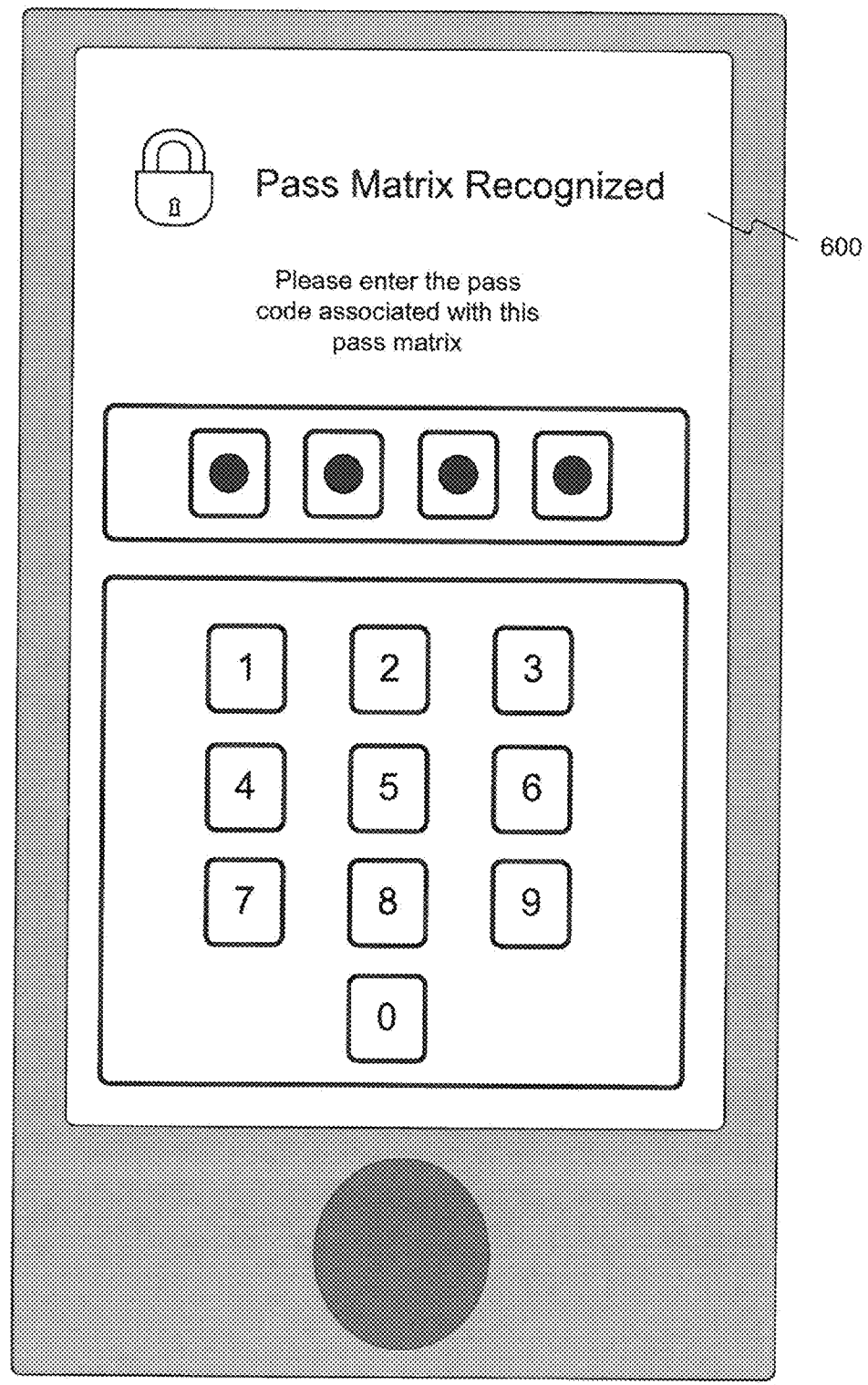
FIG. 6 is a diagram depicting an exemplary graphical user interface for inputting a passcode using a mobile device implementing a multi-factor authentication scheme, consistent with certain disclosed embodiments.

As depicted in FIG. 5, as the user is positioning pass matrix 400 beneath digital camera componentry 160, Lock Screen 300 may provide a Capture Area 510 that displays whatever physical objects are currently within the view of digital camera componentry 160 in order to enable the user to know when pass matrix 400 is ready for capture. Once the user can see that the entire pass matrix 400 is displayed within Capture Area 510, the user may press or activate a physical or GUI control, such as Capture Button 520, to instruct device 100 to capture and store a digital image of pass matrix 400. In other embodiments, digital camera componentry may automatically capture a digital image of pass matrix 400 once it is determined that all of pass matrix is within view and capable of capture, analysis, and decoding.

In step 220, device 100 captures and stores a digital image of pass matrix 400, for example, in response to a user pressing or activating Capture Button 520. In some embodiments digital camera componentry 160 may capture a digital image of pass matrix 400 in a manner that differs from convention barcode scanning.

For example, many commercially available barcode scanners may be specially designed for scanning barcodes. Such barcode scanners may be configured to project light onto a physical surface (on which is printed a barcode) in order to analyze the light as it is reflected off of the physical surface back into optical sensors resident in the barcode scanner. Hardware in the barcode scanner may analyze the reflected light to measure spacings, widths, relative sizes of printed objects, or colors of printed objects to decode binary or textual data encoded in the barcode, which binary or textual data may then be supplied to a processor or other device. Such special-purpose barcode hardware may be distinguished by any one of its use of projected light to measure reflections; its inability to read barcode data simply by sensing environmental light without the use of projected light; its discarding of or its failure to measure any graphical data other than the reflected graphical barcode components; its failure to record graphical (as opposed to decoded binary or textual) data in memory; and its nature as special purpose hardware that is not found in typical general purpose, end-user computing devices, such as personal computers, mobile telephones, or smartphones.

By contrast, digital camera componentry 160 may be used to scan pass matrix 400 in a manner that is distinguished from conventional special purpose barcode scanners. In particular, digital camera componentry 160 may capture the graphical data of pass matrix 400 by simply taking a digital picture in the same manner as it would take a digital picture of any other object that a user could choose to take a picture of using digital camera componentry 160. Digital camera componentry 160 could then store the captured image as binary data, such as an image file. Processors 120 may then analyze the image file using standard image analysis techniques to detect the presence of a particular kind of barcode, such as a QR Code, and may then decode the barcode into binary or textual data using standard barcode decoding techniques.

In some embodiments, therefore, digital camera componentry 160 may differ from a traditional barcode scanner by any one of its ability to capture barcode data simply from sensing of environmental light without the necessary use of projected light (not including a flash bulb which may be used simply to enhance captured light) to detect the barcode; its capturing of all graphical data within view (other than solely the barcode components); its detection, isolation, and analysis of the barcode after all viewable imagery has been stored in digital form in memory; and its general purpose nature as standard digital camera componentry that may be found in typical general purpose, end-user computing devices, such as personal computer, mobile telephones, or smartphones, that is intended for general digital photography, as opposed to special-purpose barcode scanning.

In step 230, device 100 decodes pass mass matrix 400 to derive a matrix code. For example, if pass matrix 400 is a QR Code, then device 100 may determine the textual or binary data that has been encoded in the QR Code using standard operations for decoding QR Codes. In the example of FIG. 4, pass matrix 400, when decoded, produces a matrix code 410 comprising the text "-=≡+++ This is Jim's pass matrix +++≡=-".

In step 240, device 100 determines whether the matrix code is associated with an authorized user. If the matrix code is not associated with an authorized user (step 240, No), then device 100 may deny the user access (step 280), and may indicate, for example, that it does not recognize the pass matrix provided by the user. If, however, device 100 determines that the matrix code is associated with an authorized user (step 240, Yes), then device 100 may allow the user to proceed to the next stage of multi-factor authentication. In step 250, device 100 may prompt the user for a password, such as a four-digit code, as depicted in screen 600 of FIG. 6.

Figure 7:
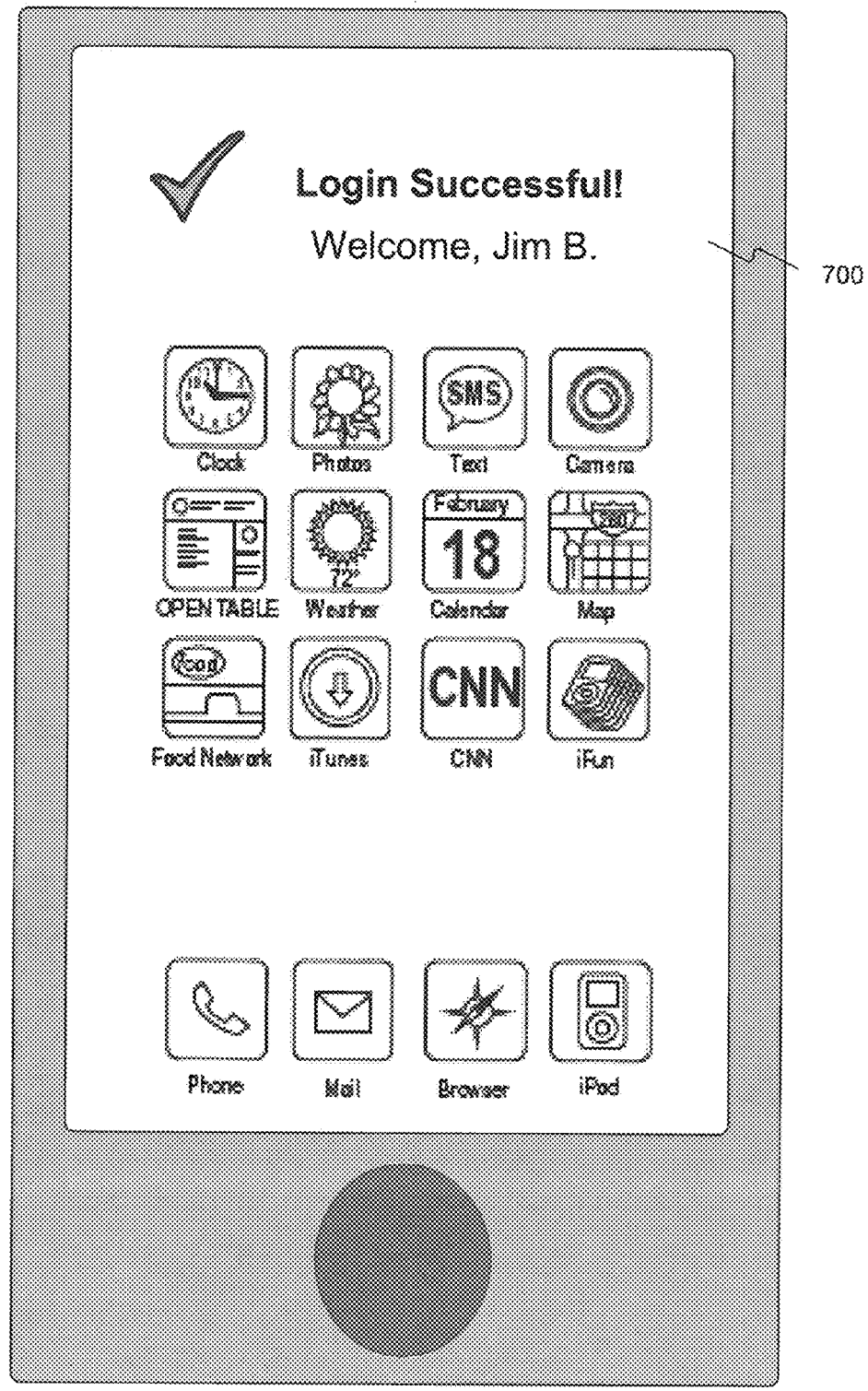
FIG. 7 is a diagram depicting an exemplary home screen on a mobile device subsequent to successful multi-factor authentication, consistent with certain disclosed embodiments.

Device 100 may then determine whether the user has entered a valid password (step 260). If the user has not entered a valid password (step 260, No), then device 100 may deny the user access (step 280), and may indicate, for example, that the user entered an incorrect password or a failed to enter a password associated with pass matrix 400. If, however, device 100 determines that the user has entered a valid password (step 260, Yes), then device 100 may determine that the user has successfully authenticated, and may grant the user access to device 100 (step 270). Once successfully authenticated, device 100 may display a Home Screen 700, as depicted in FIG. 7, to enable the user to access programs, data, or functionality provided by device 100.

In some embodiments, rather than immediately granting the user access after entry of a valid password, device 100 may subject the user to additional security requirements as part of a three-factor or n-factor authentication mechanism. For example, device 100 could require the user to provide not only a password, but a login name associated with the password. Device 100 could also require successful entry of a valid login name and password before prompting the user to scan a valid pass matrix associated with the login name or login/password pair.

A particular pass matrix may be associated with a particular user or password in any number of different ways to achieve objects consistent with the disclosed embodiments. In one exemplary embodiment, when a user first initializes device 100—e.g., upon purchase, first operation, insertion of a subscriber identification module (SIM) card, etc.—device 100 may prompt the user to input a password to allow the user to log into device 100 in the future. Device 100 may also, during the initial setup process, prompt the user to scan a graphical image, such as a QR Code, to use as a pass matrix associated with the password. The user may then scan the graphical image, which device 100 may associate with the user-provided password.

If the scanned graphical image is a barcode, such as a QR Code, that is capable of representing binary or textual data, then device 100 may simply store an association between the password and the binary or textual data of the barcode (i.e., a matrix code) in memory, rather than the barcode itself. In another embodiment, the scanned graphical image could be an image that does not decode into binary or textual data. In such an embodiment, the device 100 may instead store a copy of the image itself in memory. When the user later scans the image as part of an authentication operation, device 100 may determine whether the scanned image matches the stored image using standard image comparison techniques, as known to those skilled in the art.

It may be the case that a user does not have a barcode readily available for scanning at the time of setup. In that case, device 100 may allow for the user to use traditional one-factor authentication (e.g., simple password entry) indefinitely or for a designated period of time until the user elects to set up multi-factor authentication, at which time the user may scan an image to be used in a multi-factor authentication procedure consistent with the disclosed embodiments.

In another embodiment, as part of the multi-factor authentication setup procedure, device 100 may allow a user to enter an arbitrary string of textual characters into a textbox or other GUI component. For example, the user may enter the equivalent of a password of passphrase, such as, "Here we go, Steelers, here we go!!!", which device 100 may then encode into a pass matrix such as a QR Code. This approach may allow a user to create a pass matrix without having already printed it out for scanning. Device 100 may then provide various options for enabling the user to print out a copy of the generated QR Code, such as providing an option for emailing the QR Code (e.g., in image file form) to an email address associated with the user, connecting to a printer to print the QR Code, or transmitting the QR Code to an authorized party for printing or embodying in a security object, such as a duly issued company badge or identification card.

The invention is also not limited to implementing the disclosed multi-factor authentication using a single device 100, but may instead be implemented using various device combinations, such as a client-server architecture. In one exemplary embodiment, device 100 may be linked with or managed by one or more remote servers with which it communicates using one or more wired or wireless protocols. For example, device 100 may be part of a managed network of devices in a company or other organization. In such a network, a user may establish or modify security settings with respect to device 100 using a centralized platform, such as a secure website. The user may log into the secure website using login credentials, such as a username and password. There, the user may add or modify a pass matrix and/or associated password needed to gain access to device 100.

This centralized approach may provide several advantages over a multi-factor authentication scheme implemented entirely by device 100. For example, if a user loses a printout of a pass matrix, the user may retrieve a copy of the pass matrix for printing using the secure website. Or, if it is company policy to print pass matrices only on official company badges, the secure website may enable the user to place a request for a replacement security badge that displays the pass matrix. The secure website may also enable the user to change the pass matrix by, for example, allowing the user to input a text string for encoding in a pass matrix or by automatically generating a new pass matrix randomly or without user input.

Once a new pass matrix has been established using the secure website, device 100 may be configured to recognize the new pass matrix as a valid pass matrix using a number of different techniques. In one embodiment, one or more servers, for example a server that serves webpages as part of the secure website, may cause to be transmitted a remote instruction to device 100 to inform device 100 of the new pass matrix. Such an instruction may be transmitted wirelessly or over a wired channel, and may additionally instruct device 100 to no longer recognize one or more previously used pass matrices as valid. Using this approach, if a user loses a mobile device configured to implement multi-factor authentication techniques consistent with disclosed embodiments, the user may remotely configure the device to reject any current or previous pass matrices (e.g., to prevent unauthorized access) despite not having physical access to the device that would permit manual configuration.

In another embodiment, a security server or server system may have a public-private key pair. When a user requests a new pass matrix from the security server, the security server may first encrypt or digitally sign a message with its private key before encoding it in a pass matrix. Device 100 may maintain a copy of the public key. When a user authenticates using an encrypted or digitally signed pass matrix, device 100 may decrypt the matrix code using the public key. If the matrix code successfully decrypts or, when decrypted, has certain properties, then device 100 may know that the pass matrix is valid, despite not having that particular pass matrix or matrix code stored in memory, and despite not consulting the security server during the authentication process. Device 100 may know that the pass matrix is valid because it may be assumed that only a server having the private key (i.e., the security server) could have encrypted or digitally signed the pass matrix presented by the user.

For example, when a user requests a new pass matrix from the security server, the security server may prompt the user to enter a password (equivalently: passphrase, passcode, etc.) associated with the new pass matrix. Once the user supplies the password, the security server may encrypt the password with its private key, or may supply a digital signature associated with the password using its private key, which output may be encoded in the pass matrix. When the user scans the pass matrix, device 100 may decrypt the matrix code or digital signature using the public key. Device 100 may then prompt the user for the password associated with the pass matrix. If the user-supplied password matches the decrypted matrix code or decrypted digital signature, then device 100 may recognize the pass matrix-password combination as valid, despite having no prior memory or knowledge of either.

In another embodiment, device 100 may rely on or more remote devices (e.g., web servers) to determine whether a particular pass matrix is valid, rather than storing a list of valid pass matrices or matrix codes in local memory. For example, after device 100 has scanned a pass matrix provided by the user, device 100 may decode the pass matrix to derive its matrix code, and may then send the matrix code to a remote authentication server. The remote authentication server, which may store or have access to an authoritative list of valid matrix codes for the device, may then transmit a response to device 100 indicating whether the matrix code, and thus the pass matrix, is valid. In this manner, a user may add, change, or delete pass matrices associated with device 100 entirely at a central authentication server or website without having to reconfigure or modify device 100.

The invention is also not limited to situations in which device 100 is configured or programmed to recognize only one valid pass matrix, password, or user. In some embodiments, device 100 may be configured to recognize multiple, distinct pass matrices as valid, each of which provides a different degree of access to data, programs, or functionalities provided by device 100. For example, a first user may desire to allow a second user to access her mobile device, but only under certain conditions. The first user may therefore configure device 100 to recognize two different pass matrices as valid. Device 100 may be configured to enable a user who authenticates with the first pass matrix to gain full access to data, programs, or functionality provided by the device, but to enable a user who authenticates with the second pass matrix to gain reduced access to data, programs, or functionality compared to the first pass matrix. Alternatively or additionally, the second pass matrix provide access to a user for only a limited period of time. The first and the second pass matrices may have different passwords or the same password associated with them. In other embodiments, device 100 may be configured to associate two different passwords with a single pass matrix, each password providing a different level of access to the authenticating user.

Although described primarily in the context of a handheld device, such as a mobile phone or smartphone, the foregoing embodiments are not limited to any particular device, but may also be applied to any device capable of performing the multi-factor authentication techniques described herein. For example, the foregoing embodiments may be practiced by a traditional desktop or laptop computer having digital camera functionality, whether such componentry is resident in the computer itself or is provided by a separately connected peripheral device. Although, for reasons described above, in some embodiments, the invention may have particular utility in devices that have digital camera componentry in native hardware support, such that the devices could be configured to perform the disclosed embodiments entirely by software upgrade.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. The steps described need not be performed in the same sequence discussed or with the same degree of separation. Likewise various steps may be omitted, repeated, or combined, as necessary, to achieve the same or similar objectives or enhancements. Accordingly, the invention is not limited to the above-described embodiments, but instead is defined by the appended claims in light of their full scope of equivalents.

In the claims, unless specified otherwise, the term "password" is to be construed as any sequence of characters (including numbers, letters, or other symbols), and encompasses passcodes, passphrases, and their equivalents, including user-provided gestures or patterns. The term "barcode" is also to be construed to be any graphical image capable of representing a sequence of characters (including numbers, letters, or other symbols) in accordance with a particular encoding or decoding standard, unless specified otherwise. The term "character data" is also to be construed as a series of letter, number, or other symbols, such as Unicode symbols, unless specified otherwise. The term "computer-readable medium" is to be construed as encompassing any tangible medium capable of storing computer-instructions in a non-transitory manner, including hard disk drives, flash memory, random access memory, CD-ROMs, etc.

What is claimed is:

1. A method of implementing a multi-factor authentication scheme in a mobile telephone having a camera and one or more processors, the method comprising:
    as part of a setup procedure:
        providing to a remote server a character string input to a user input of the mobile telephone; and
        receiving by email a security QR Code in a printable format, wherein the security QR code comprises the character string encrypted with a private key of a public-private key pair to produce an encrypted character string and subsequently encoded into the security QR Code;
    maintaining, in a storage medium of the mobile telephone, a plurality of applications configured to be executed on the mobile telephone;
    receiving a request from a user to access the mobile telephone;
    prompting the user to present a QR Code printed onto paper corresponding to the security QR Code;
    scanning the QR Code printed onto paper using the camera of the mobile telephone;
    determining that the QR Code printed onto paper is associated with authorized access to the mobile telephone, wherein the determining comprises decoding the QR Code printed onto paper to derive the encrypted character string, and decrypting the encrypted character string using a public key of the public-private key pair, wherein the public key is stored on the mobile telephone;
    prompting the user to enter a password;
    receiving the password from the user at the user input of the mobile telephone;
    determining that the received password is associated with authorized access to the mobile telephone; and
    granting the user access to the plurality of applications on the mobile telephone in response to determining that the QR Code printed onto paper is associated with authorized access to the mobile telephone and determining that the received password is associated with authorized access to the mobile telephone.

2. The method of claim 1, further comprising:
    receiving input from a remote server as to whether the password is associated with authorized access to the mobile telephone.

3. A mobile telephone configured to perform a multi-factor authentication scheme, the mobile telephone comprising:
 a processing system comprising one or more processors;
 one or more executable applications;
 a camera; and
 a memory system comprising one or more computer-readable media, wherein the computer-readable media contain instructions that, when executed by the processing system, cause the processing system to perform operations comprising:
  as part of a setup procedure:
   providing to a remote server a character string input to a user input of the mobile telephone; and
   receiving by email a security QR Code in a printable format, wherein the security QR code comprises the character string encrypted with a private key of a public-private key pair to produce an encrypted character string and subsequently encoded into the security QR Code;
  receiving a request from a user to access the mobile telephone;
  prompting the user to present a QR Code printed onto paper corresponding to the security QR Code;
  scanning the QR Code printed onto paper using the camera;
  determining that the QR Code printed onto paper is associated with authorized access to the mobile telephone, wherein the determining comprises decoding the QR Code printed onto paper to derive the encrypted character string, and decrypting the encrypted character string using a public key of the public-private key pair, wherein the public key is stored on the mobile telephone;
  prompting the user to enter a password;
  receiving the password from the user using the user input to the mobile telephone;
  determining that the received password is associated with authorized access to the mobile telephone; and
  granting the user access to the one or more applications in response to determining that the QR Code printed onto paper is associated with authorized access to the mobile telephone and determining that the received password is associated with authorized access to the mobile telephone.

4. The mobile telephone of claim 3, wherein scanning the QR Code printed onto paper comprises:
 capturing a digital image of the QR Code printed onto paper.

5. The mobile telephone of claim 3, the operations further comprising:
 receiving input from a remote server as to whether the security QR Code or the password is associated with authorized access to the mobile telephone.

6. A non-transitory computer-readable medium tangibly embodying computer instructions for performing, by one or more processors of a mobile telephone, a method of implementing a multi-factor authentication scheme comprising:
 as part of a setup procedure:
  providing to a remote server a character string input to a user input of the mobile telephone; and
  receiving by email a security QR Code in a printable format, wherein the security QR code comprises the character string encrypted with a private key of a public-private key pair to produce an encrypted character string and subsequently encoded into the security QR Code;
 receiving a request from a user to access the mobile telephone;
 prompting the user to present a QR Code printed onto paper corresponding to the security QR Code;
 scanning the QR Code printed onto paper using a camera of the mobile telephone;
 determining that the QR Code printed onto paper is associated with authorized access to the mobile telephone, wherein the determining comprises decoding the QR Code printed onto paper to derive the encrypted character string, and decrypting the encrypted character string using a public key of the public-private key pair, wherein the public key is stored on the mobile telephone;
 prompting the user to enter a password at the user input to the mobile telephone;
 receiving the password from the user;
 determining that the received password is associated with authorized access to the mobile telephone; and
 granting the user access to the mobile telephone in response to determining that the QR Code printed onto paper is associated with authorized access to the mobile telephone and determining that the received password is associated with authorized access to the mobile telephone.

7. The non-transitory computer-readable medium of claim 6, the method further comprising:
 receiving input from a remote server as to whether the password is associated with authorized access to the mobile telephone.

* * * * *